Figure 1:
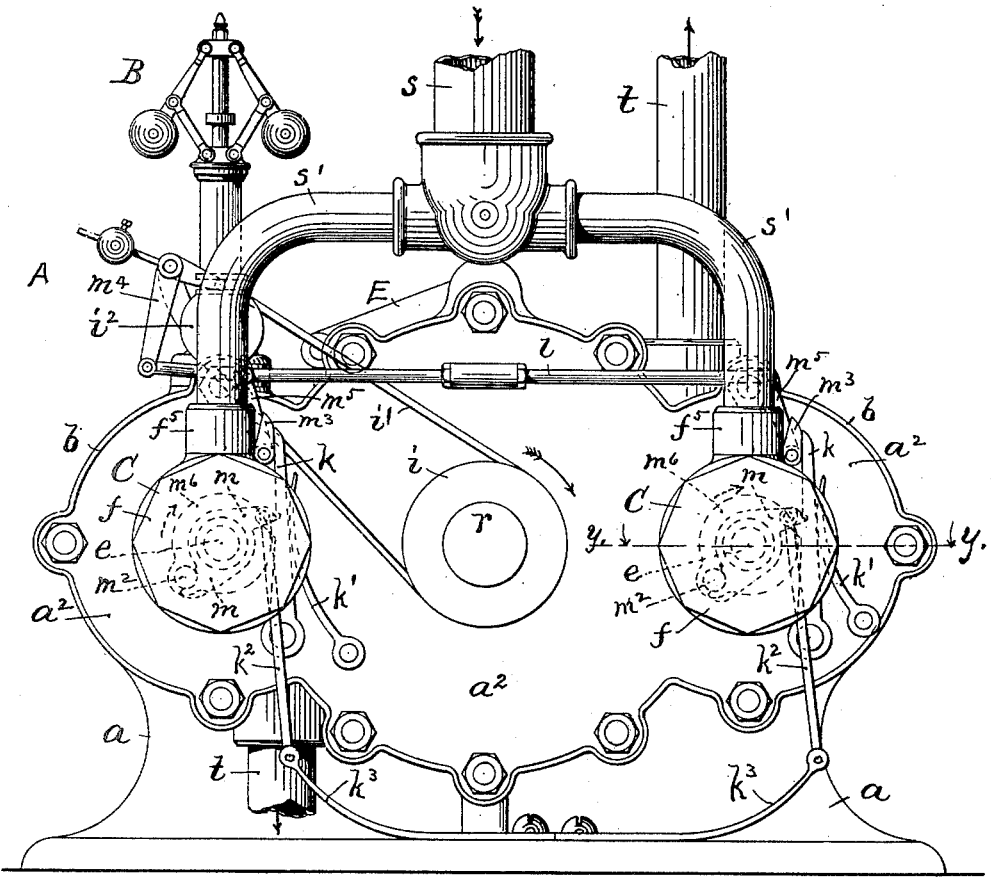

(No Model.)  11 Sheets—Sheet 1.
L. H. WATTLES.
ROTARY PISTON ENGINE.
No. 595,227.  Patented Dec. 7, 1897.

WITNESSES:
Harry J. Gaveau.
Remington Sherman

INVENTOR.
Luther H. Wattles.
By Geo. H. Remington & Co.
ATTYS.

(No Model.)  
11 Sheets—Sheet 2.

L. H. WATTLES.
ROTARY PISTON ENGINE.

No. 595,227. Patented Dec. 7, 1897.

WITNESSES:  
Harry J. Garceau  
Remington Sherman

INVENTOR:  
Luther H. Wattles  
BY Geo. H. Remington &c.  
ATTY'S.

(No Model.) 11 Sheets—Sheet 3.
L. H. WATTLES.
ROTARY PISTON ENGINE.

No. 595,227. Patented Dec. 7, 1897.

WITNESSES: INVENTOR:
Harry J. Garceau Luther H. Wattles.
Remington Sherman BY Geo. H. Remington & Co.
ATTYS.

(No Model.) 11 Sheets—Sheet 4.

L. H. WATTLES.
ROTARY PISTON ENGINE.

No. 595,227. Patented Dec. 7, 1897.

WITNESSES:
Harry J. Garceau
Remington Sherman

INVENTOR:
Luther H. Wattles.
By Geo. H. Remington & Co.
ATTYS.

(No Model.)  11 Sheets—Sheet 5.
L. H. WATTLES.
ROTARY PISTON ENGINE.

No. 595,227. Patented Dec. 7, 1897.

WITNESSES: Harry J. Garevan, Remington Sherman

INVENTOR: Luther H. Wattles.
BY Geo. H. Remington & Co.
ATTYS.

(No Model.) 11 Sheets—Sheet 6.

L. H. WATTLES.
ROTARY PISTON ENGINE.

No. 595,227. Patented Dec. 7, 1897.

(No Model.) 11 Sheets—Sheet 7.

L. H. WATTLES.
ROTARY PISTON ENGINE.

No. 595,227. Patented Dec. 7, 1897.

WITNESSES:
Harry J. Garceau
Remington Sherman

INVENTOR:
Luther H. Wattles
BY Geo. H. Remington & Co.
ATTYS.

(No Model.) 11 Sheets—Sheet 8.
L. H. WATTLES.
ROTARY PISTON ENGINE.

No. 595,227. Patented Dec. 7, 1897.

WITNESSES: Harry J. Garceau, Remington Sherman

INVENTOR: Luther H. Wattles.
BY Geo. H. Remington & Co.
ATTYS.

(No Model.) 11 Sheets—Sheet 9.
L. H. WATTLES.
ROTARY PISTON ENGINE.

No. 595,227. Patented Dec. 7, 1897.

WITNESSES:
Harry J. Garceau
Remington Sherman

INVENTOR:
Luther H. Wattles.
BY Geo. H. Remington & Co.
ATTYS.

(No Model.) 11 Sheets—Sheet 11.
L. H. WATTLES.
ROTARY PISTON ENGINE.

No. 595,227. Patented Dec. 7, 1897.

United States Patent Office.

LUTHER H. WATTLES, OF PROVIDENCE, RHODE ISLAND, ASSIGNOR, BY MESNE ASSIGNMENTS, TO THE WATTLES STEAM AND GAS ENGINE COMPANY, OF SAME PLACE.

ROTARY-PISTON ENGINE.

SPECIFICATION forming part of Letters Patent No. 595,227, dated December 7, 1897.

Application filed April 26, 1897. Serial No. 633,895. (No model.)

*To all whom it may concern:*

Be it known that I, LUTHER H. WATTLES, a citizen of the United States, residing at Providence, in the county of Providence and State of Rhode Island, have invented certain new and useful Improvements in Rotary-Piston Engines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to rotary engines of the class in which the steam or other force acting against the revolving piston is used expansively.

In engines of the type referred to it has been proposed in some cases to employ swinging valves which are further adapted for use as abutments, and in other instances the mechanically-movable abutments have been independent of the valve mechanism. There are objections or disadvantages inherent in such former engines—that is to say, the limited degree of steam expansion as well as the increased percentage of "clearance" or added steam-space render them less efficient. The percentage of working friction is materially increased by reason of the multiplication of moving parts, such as levers and connections, necessarily employed to actuate the valves and abutments.

The object I have in view is to produce a rotary engine in which the disadvantages above referred to are to a great extent eliminated and resulting in a greater degree of efficiency. Moreover, my improved engine is capable of running more regularly and smoothly and with less vibration and at the same time being comparatively noiseless, except the slight sound produced by the action of the liberating valve-gear when the cut-off takes place. In my improved engine the steam enters the cylinders at substantially steam-chest pressure, because the steam-ports are very short, the latter in turn not being uncovered until they are fully open to the piston.

In carrying out my invention I employ a revolving piston, preferably ellipsoidal in form, the two bearing-faces thereof being in engagement with the bore of the cylinder. At one side of the cylinder and directly communicating therewith is formed a circular projection or wing in which is mounted an oscillating ported steam-chest, also constituting an abutment, having an independently-movable steam-valve therein for controlling the flow of steam from said chest into the cylinder. A well-known form of governor-controlled detachable valve-gear is used for automatically cutting off the steam at any point within its range of action, while at the same time positively-acting mechanism, combined with a revolving cam, oscillates the steam-chest back and forth on its axis in unison with the piston's movement.

Figure 2:
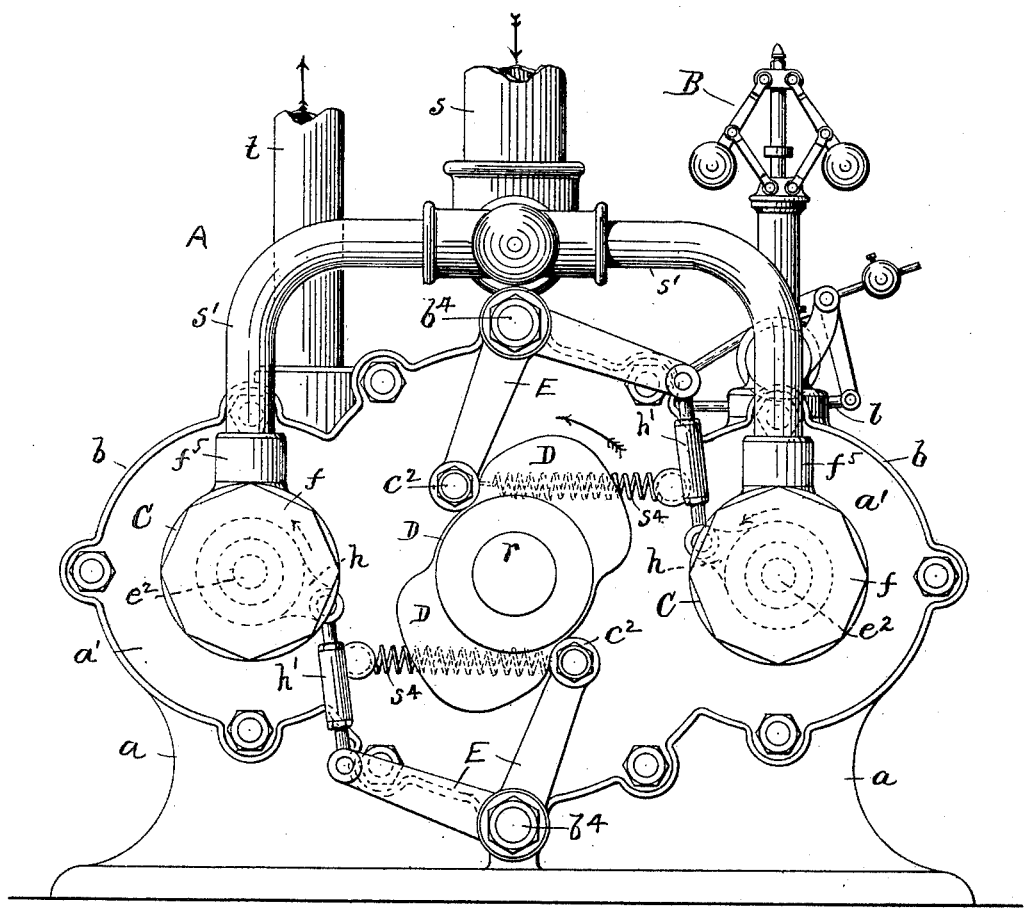
Figure 3:
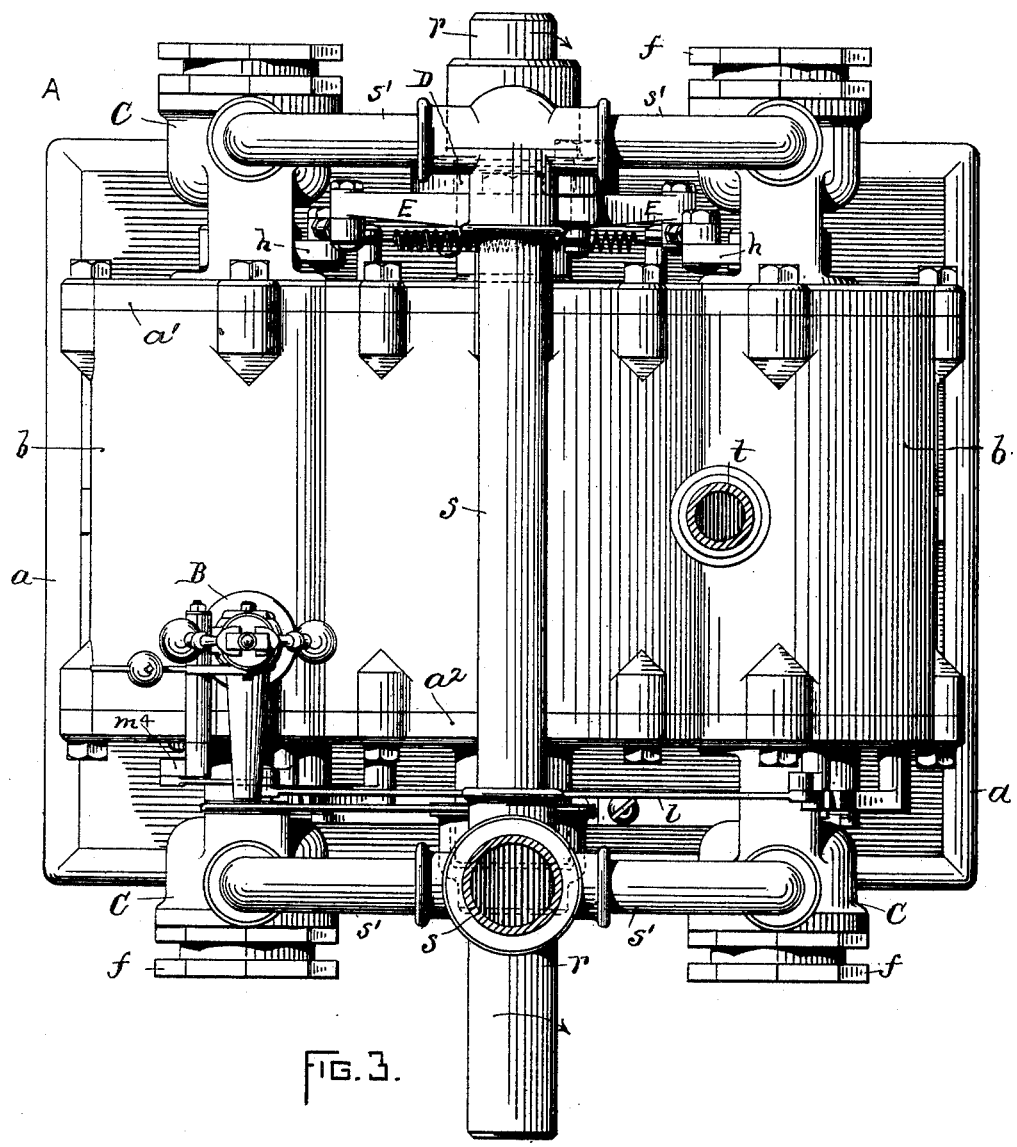
Figure 4:
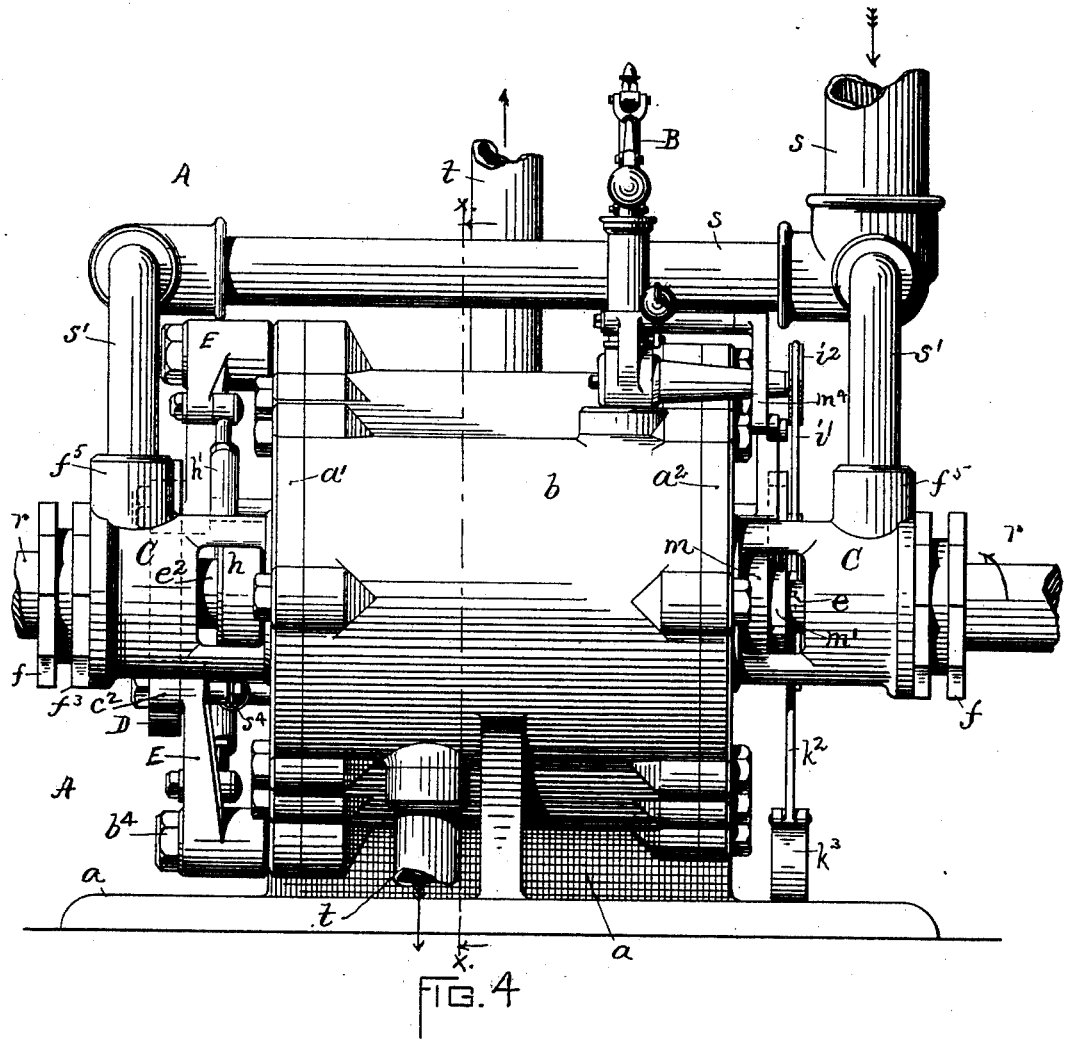
Figure 5:
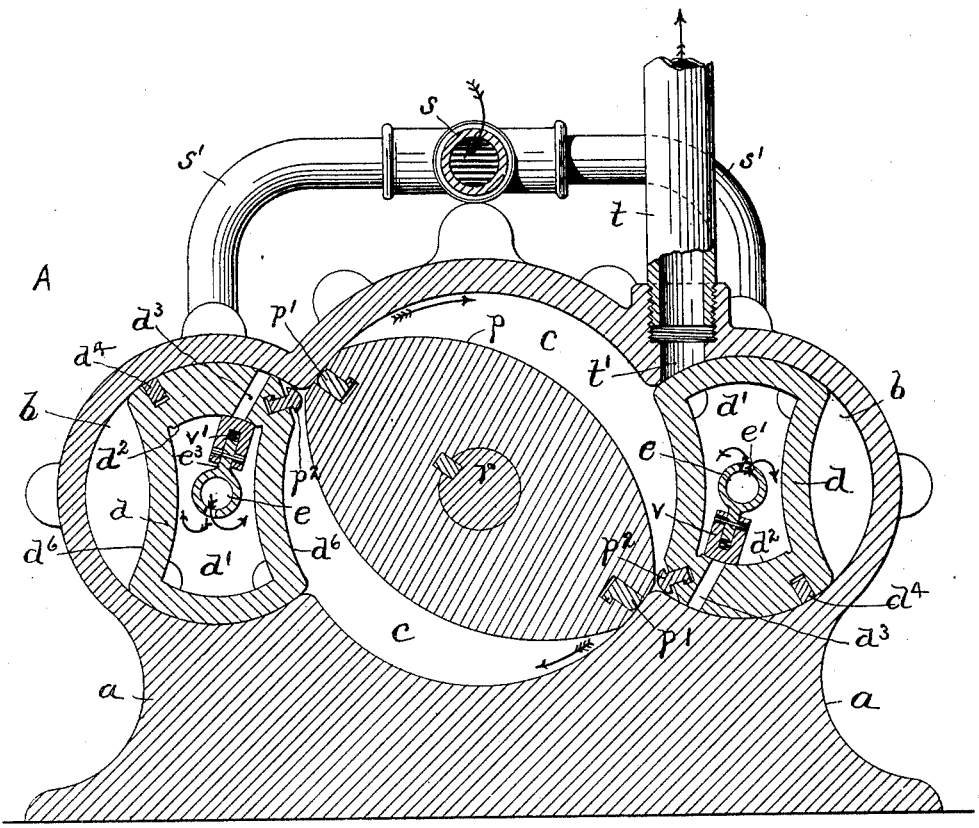
Figure 6:
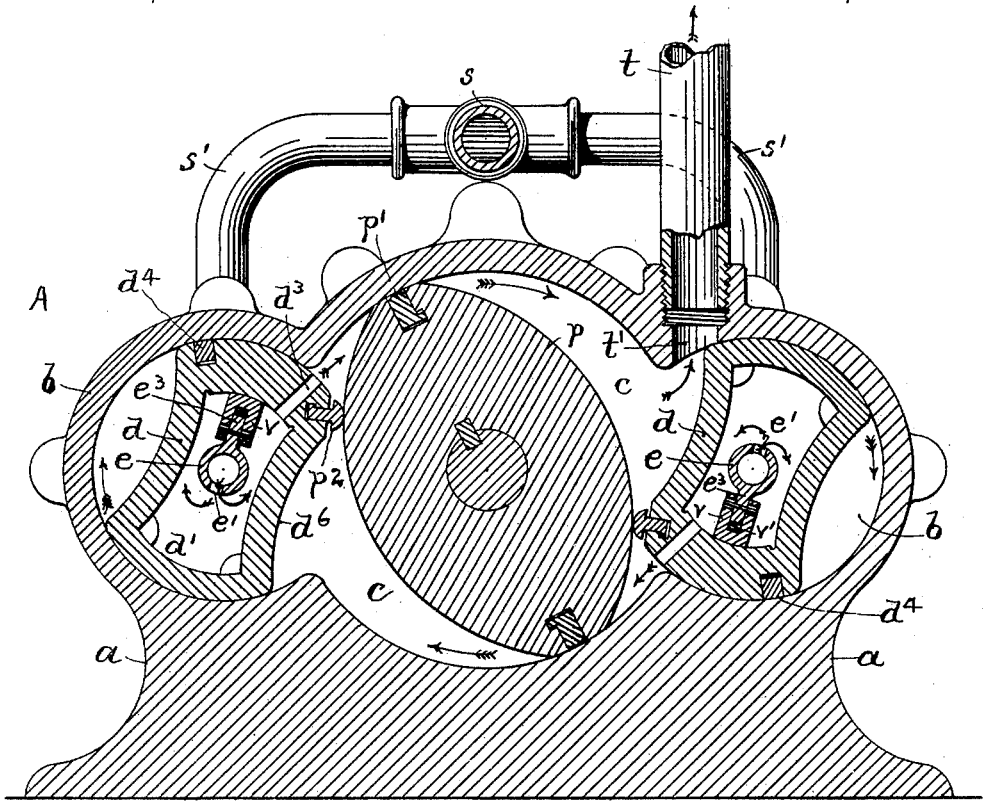
Figure 7:
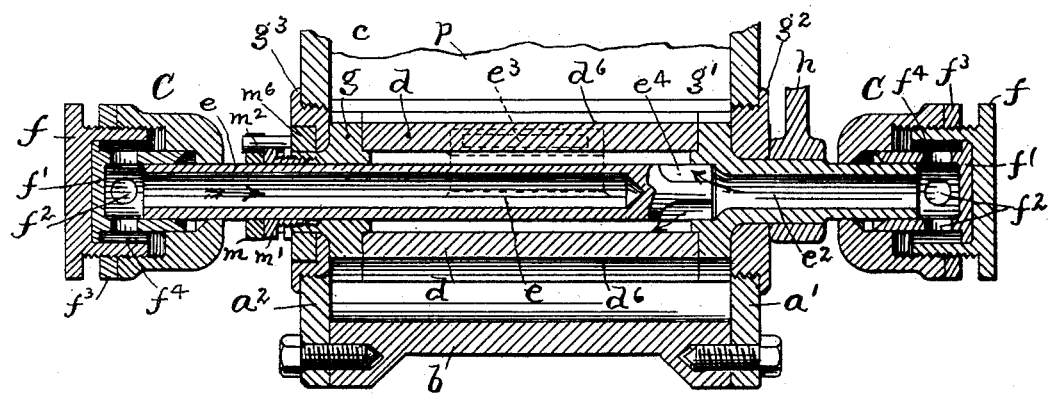
Figure 8:
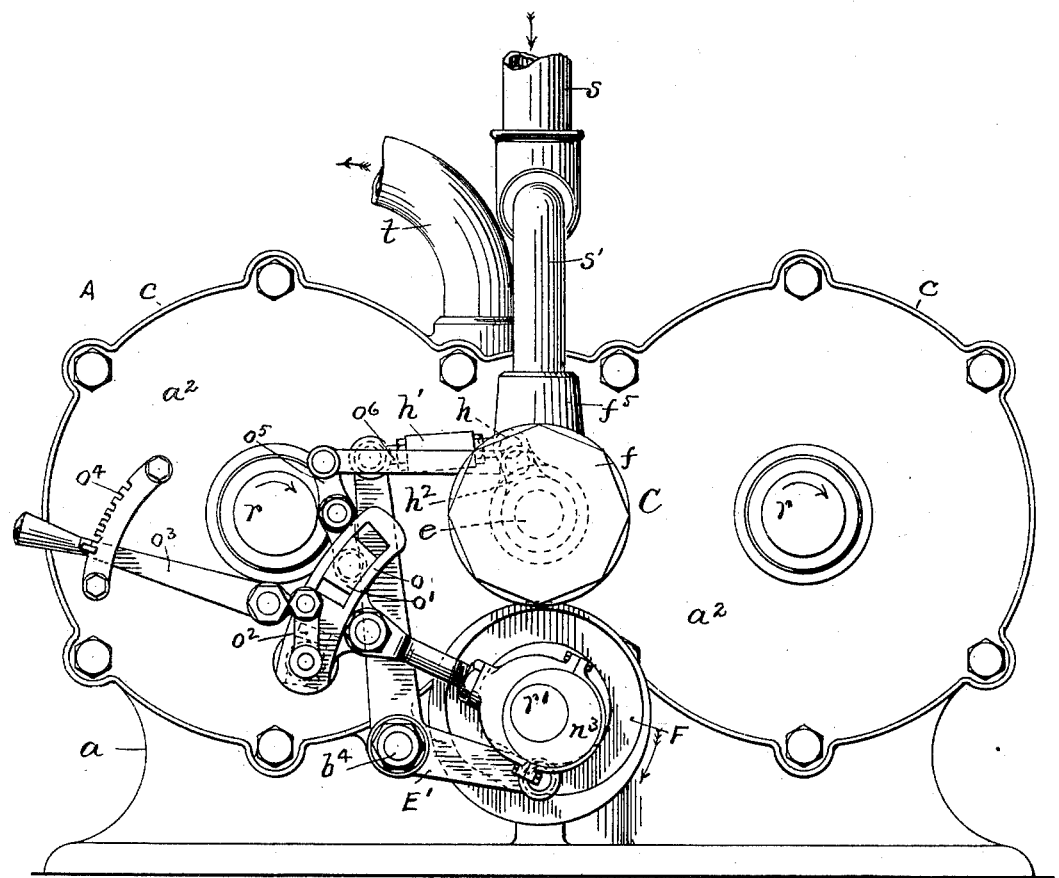
Figure 9:
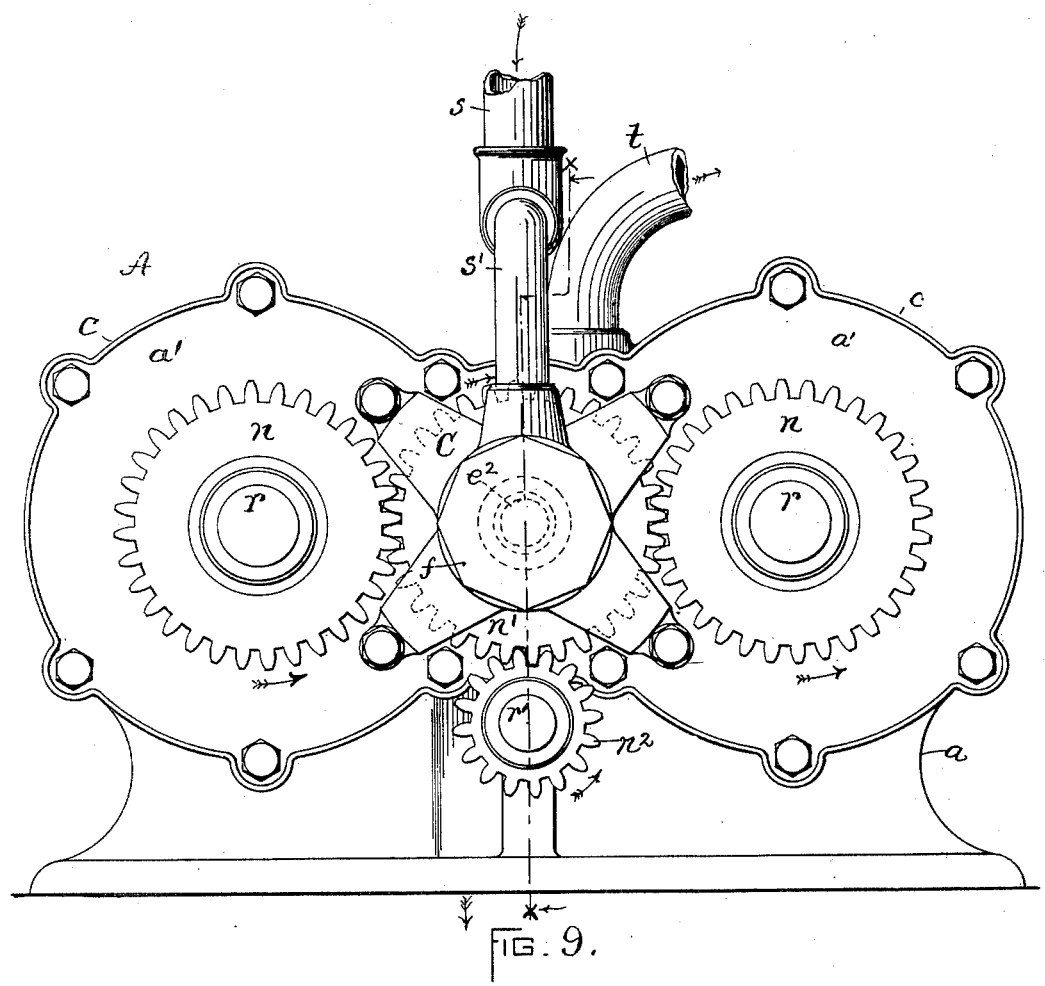
Figure 10:
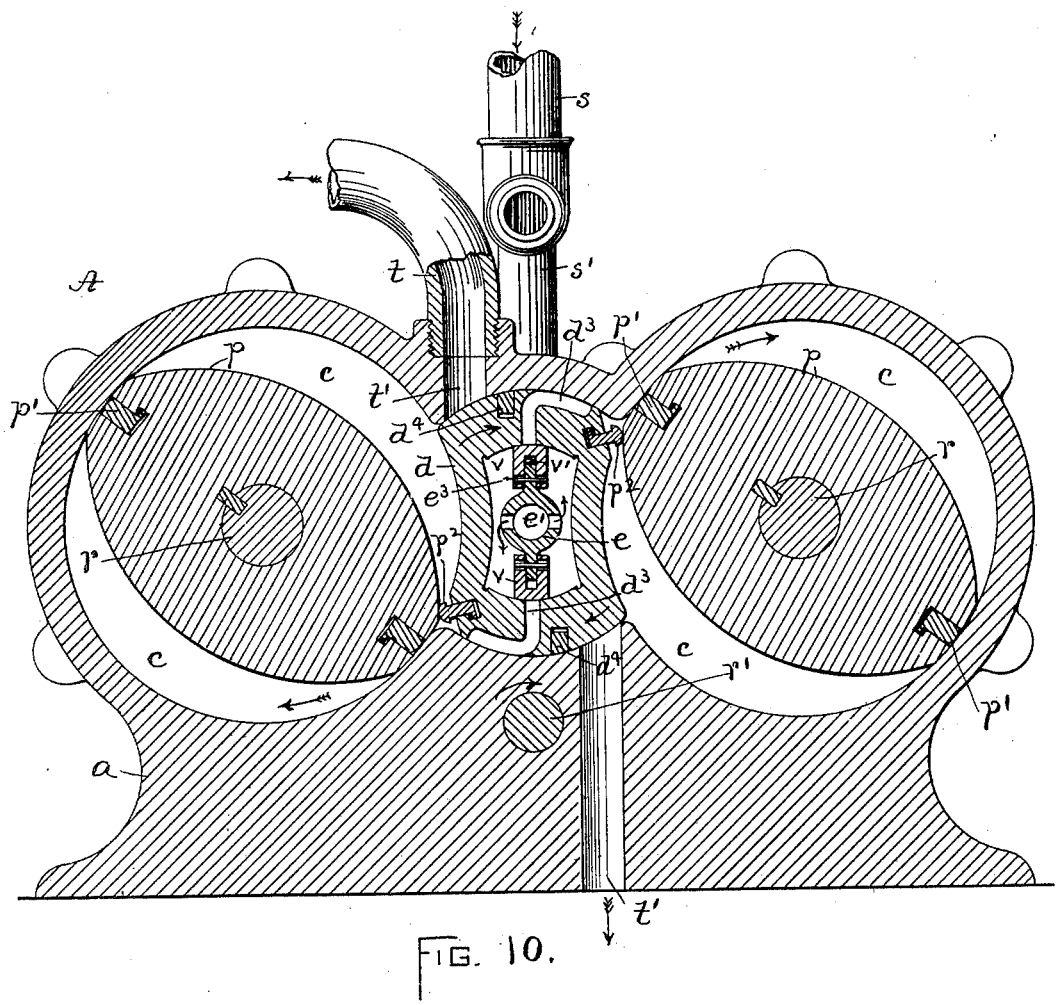
Figure 11:
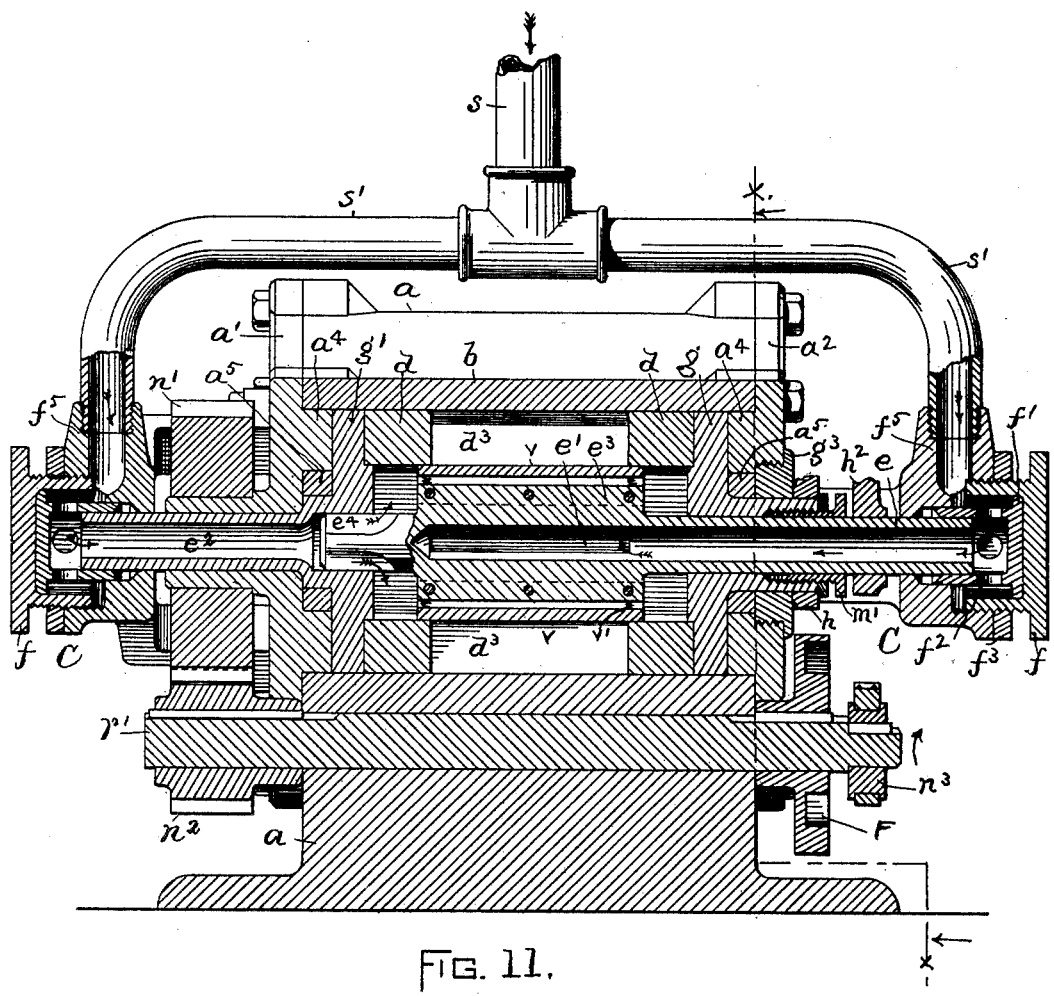
Figure 12:
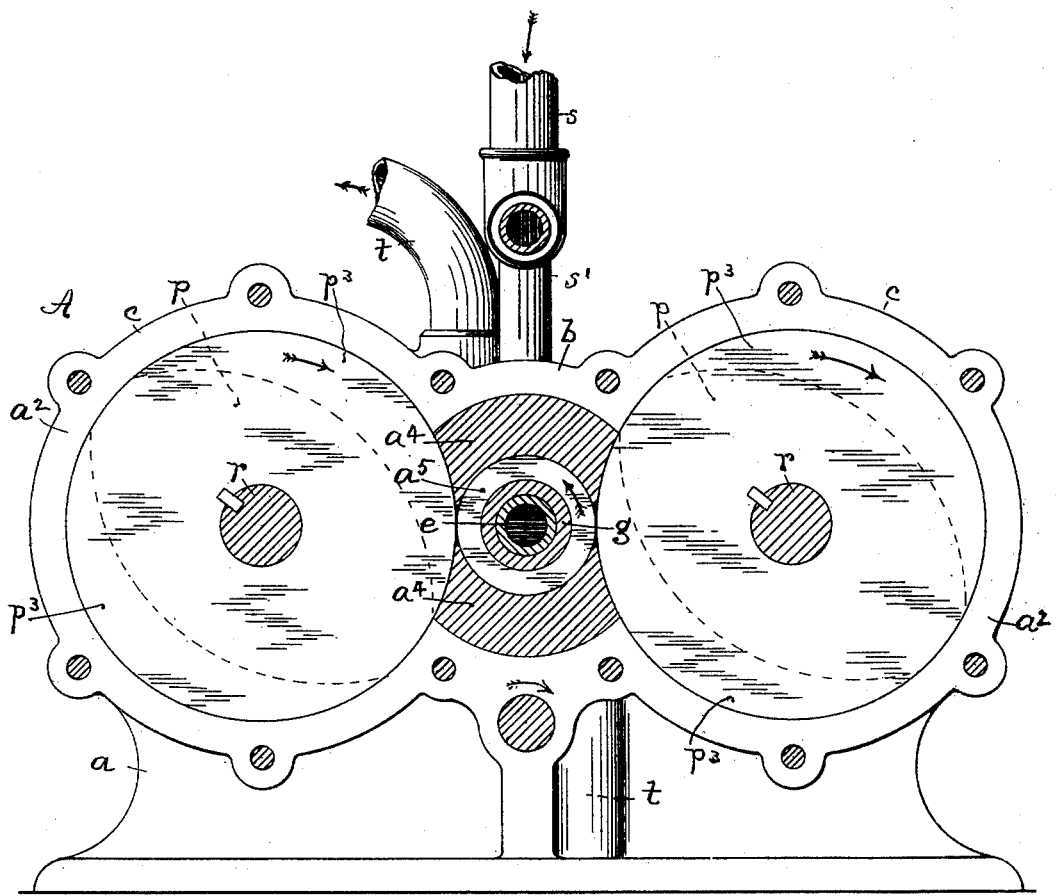

In the accompanying drawings, Figure 1 is a front end elevation of my improved rotary engine. Fig. 2 is a corresponding back end view. Fig. 3 is a plan view. Fig. 4 is a side elevation viewed from the left of Fig. 1. Fig. 5 is a transverse section taken substantially on line $x$ $x$ of Fig. 4. Fig. 6 is a similar sectional view showing the relation of the piston and valve-carrying steam-chests while the steam-ports are open. Fig. 7 is a horizontal section taken on line $y$ $y$ of Fig. 1, portions of the valve-gear being omitted. Fig. 8 is a front end elevation corresponding with Fig. 1, showing a modification embodying a double-cylinder engine having a single steam-chest or swinging abutment. Fig. 9 is a corresponding back end elevation. Fig. 10 is a transverse section taken substantially through the center of the engine, the ports being in the normal position. Fig. 11 is a vertical section taken substantially on line $x$ $x$ of Fig. 9, and Fig. 12 is a partial section through line $x$ $x$ of Fig. 11.

I would state here that the engine as drawn is adapted to run in one direction only. In order to adapt it to travel in the opposite direction, the arrangement of the steam chests, valves, and piping should be reversed.

In my improved rotary engine A, again referring to the drawings, the frame or casing $a$ consists of a single casting, the center portion being bored out to form the concentric cylinder $c$ and having oppositely-arranged side wings or extensions $b\ b$. These latter are also bored and communicate directly with the cylinder and form circular chambers for the oscillating steam-chests $d$. To the front and rear ends or faces of the said casting $a$ are secured heads or covers $a^2\ a'$, respectively. The curvature of the center and side cylinders $c\ b$ intersect each other interiorly at points both above and below a line drawn horizontally between or through their centers, the vertical distance between such points being, say, about one-half the diameter of the main or piston-carrying cylinder.

The piston $p$ is secured to the main or driving shaft $r$, the latter extending centrally through the cylinder and its heads $a^2\ a'$ and through stuffing-boxes in any suitable manner.

The piston itself, $p$, I prefer to make elliptical in form and also solid, substantially as shown in Fig. 5. The two ends or contact-faces of the piston are provided with steam-tight packings $p'$, thus preventing the steam from escaping. As thus constructed and arranged it will be seen that a crescent-shaped steam-space is produced on each side of the piston.

The combined steam-chest and abutment members $d\ d$ are hollow and are turned to fit the bore of the side chambers $b\ b$. The vertical sides of the abutments are concave and adapted to form a continuation of the bore of the main cylinder $c$. In the arrangement represented in Figs. 5 and 6 it will be seen that the steam is admitted to both sides of the piston and at substantially diagonally opposite points, thus giving four "impulses," as they may be termed, to the piston per revolution. Each abutment $d$ is provided interiorly with a steam-valve $v$, which controls the admission of steam into the cylinder $c$ via the steam-port $d^3$, formed in the wall of the abutment. Between the said port and the inner edge of the member $d$ is located a steam-packing $p^2$, adapted to frictionally engage the adjacent side of the revolving piston and thus prevent steam from escaping into the exhaust-passage. The steam-chests $d$ have an intermittent oscillatory movement on their axes of about ninety degrees, the normal position being represented in Fig. 5. In order to prevent live steam from passing into the chambers $b$, the outer or ported walls of the abutments are provided with packing members $d^4$.

The steam-chests or abutments $d$ are hollow, as before stated, and are mounted on hollow valve-rods communicating with the steam-pipe connections. In Fig. 7 I have represented one of the abutments as being cut longitudinally through its center. As drawn, the member $d$ is open at each end and is secured to the front and rear heads $g\ g'$. The latter head $g'$ has an integral hollow stem or trunnion $e^2$, extending through a cap $g^2$, screwed into the corresponding cover $a'$, the outer or free end of the stem part being mounted in a fixed stuffing-box C, soon to be described. Motion is imparted to the steam-chest $d$ through the medium of an arm or lever $h$, secured to the stem $e^2$. The opposite or front end of the steam-chest or oscillating abutment is secured to the corresponding head $g$, the latter having a short tubular extension mounted to turn in the front cap $g^3$, screwed into the cover $a^2$. The head $g$ is bored out to freely receive the hollow valve-stem $e$, the rear end of the latter being closed and supported in the said head $g'$. In order to produce a free passage for live steam into the steam-chest $d$ from the hollow stem $e^2$, the end portion of the stem $e$ is cut away or grooved peripherally for the purpose, as shown at $e^4$. The front portion of the stem $e$ is mounted in a stuffing-box C.

It will be seen, referring to Figs. 5 and 6, that the portion of the hollow valve-stem $e$ within the steam-chest is provided with a continuously-open steam-passage $e'$ and an oppositely-arranged short arm $e^3$. To this latter is attached the cut-off valve $v$, which in turn is kept in engagement with the seat formed within the steam-chest by means of the steam-pressure and the auxiliary springs $v'$. From the foregoing it is obvious that live steam may be admitted into the steam-chest from both ends simultaneously, or from either end, thus balancing the pressure within the chest, &c.

From the description thus far made it is clear that the oscillatory movements of the steam-chest $d$ alone will, if properly timed, operate to uncover the port $d^3$, thus admitting live steam into the cylinder $c$ and forcing the piston ahead, (see arrow direction;) but the action of the member $d$ in such case is more wasteful of steam and in effect would be the equivalent of and operate substantially the same as though the steam-chest itself were a valve. By the addition of a valve proper, as $v$, having an oscillatory movement independently of that of the chest in which it is mounted the steam may, by suitable mechanism, be cut off automatically at any point (within its range) in the stroke or angular movement of the piston, thereby practically converting the rotary-piston type of engine into one having substantially the efficiency of reciprocating piston-engines provided with automatically-operating cut-off valve-gear, and by means of suitable mechanism the valve $v$ may be set at any desired point, thereby providing the engine with a fixed cut off, the inner surface or valve-seat of the steam-port $d^3$ in this case being opened and closed by traveling across the face of the valve $v$. The said stuffing-boxes for the valve-stems $e$ $e^2$ are arranged in the outer heads or brackets C, secured to both the cylinder-heads $a^2\ a'$ at the center of the steam-chest chambers $b$. (See Figs. 3, 4, 7, &c.) The upper side of each bracket has a nozzle or hub $f^5$, into which the lower end of the branch steam-pipe $s'$ enters, the said hub having an opening communicating directly with the annular space $f^4$, which latter in turn communicates with the hollow valve-stem through holes $f^2$, formed in the side of the inner gland member $f'$. Thus it will be seen that the steam is in continuous communication with the interior of the oscillating steam-chest. The gland $f'$ is kept in position by means of the enlarged cap-gland $f$, screwed into the outer end of the bracket, the check-nut $f^3$ serving to prevent the cap from unscrewing.

As drawn, the main steam-pipe $s$ is provided with four branches $s'$, which are screwed into the four brackets C, thereby insuring the presence of steam in the steam-chests $d$ at substantially boiler-pressure, the steam-chests also forming to some extent reservoirs for the steam.

The exhaust-opening $t'$ is shown as being located at or near the point of intersection of the cylinders $c$ and $b$ and at the side of the steam-chest opposed to the steam-port $d^3$. An outlet-pipe $t$ communicates with said exhaust-opening $t'$. Where two chests $d$ are employed, two exhaust-pipes $t$ are used. (See Figs. 4 and 5.) These may be united into a single larger pipe, if desired.

The mechanism for oscillating the steam-chests $d$ on their axes may be described as follows: To the rear end of the piston rod or shaft $r$ is secured a suitably-shaped cam D, (see Fig. 2,) which in revolving vibrates the two-arm or bell-crank levers E, pivoted to the upper and lower sides of the frame or casing $a$. The free end of each lever carries a roller $c^2$, the same being in engagement with the cam's surface. The other arm of the lever is jointed to a connection $h'$, which in turn is jointed to the short arm $h$, secured to the hollow stem $e^2$ of the steam-chest $d$. A spring $s^4$ may be employed in lieu of a track-cam for the purpose of keeping the said rollers in continuous contact with the cam. Thus it will appear that the oscillatory movements of the steam-chests are coincident with certain parts of the piston's movement, the form of the cam being such, say, that it causes the port $d^3$ of the steam-chest to be quickly opened and closed and while the piston is making one-fourth of a revolution. Fig. 6 shows the relation of the parts while steam is passing from the chest into the cylinder. In this case the relative movements of the chest to the piston are invariable, since the cam is fixed to the shaft. Obviously a slight change may be made by altering the position of the cam, or a cam having a different form may be substituted.

In order to convert the engine into one adapted to automatically cut off the steam at different points in the piston's stroke, I have represented a well-known form of fly-ball governor B, arranged to control the movements of the cut-off valve $v$, mounted within the steam-chest $d$, the governor being driven by a pulley $i$, secured to the driving-shaft $r$, from which a belt $i'$ passes to and over a similar pulley $i^2$ of the governor. In this device (see Fig. 1, &c.) a steam-valve arm or lever $m$ (see also Fig. 7) is secured to the valve-stem $e$. The upper end of said lever is adapted to hook onto or frictionally engage a shoulder formed on the vertically-arranged pivoted latch-lever $k$, resisted by a spring $k'$. The lower or opposite end of the lever $m$ is adapted to bear snugly against the pin $m^2$, secured to and extending horizontally from the collar $m^6$, the latter in turn being mounted to turn in a recess formed in the front cap $g^3$, and since the collar $m^6$ is fixed to the stem or trunnion of the front head $g$ of the steam-chest it is evident that its movements are actuated and controlled by the latter at all times. It will be seen, too, (see Fig. 1,) that the latch-lever $k$ is adapted to hold the cut-off valve stationary while the steam-chest is being swung ahead to uncover the steam-port. (See Fig. 6.) Meanwhile, should the load upon the engine be reduced the speed of the governor will for the instant be slightly accelerated, thereby (through the medium of the arm $m^4$, connection $l$, lever $m^5$, and cam-lever $m^3$ shown in Fig. 1,) causing the latch-lever $k$ to be forcibly detached from the latch end of the valve-arm $m$, the spring $k^3$ at the same time quickly swinging the valve $v$ across and closing the port $d^3$, thus cutting off live steam from the cylinder. The arm $m$ is jointed to a connection $k^2$, the latter being jointed to a stiff spring $k^3$, located at the base of the frame $a$. When the member $m$ is thus tripped or released, the spring instantly swings it ahead until arrested by the pin $m^2$ of the collar $m^6$, the tension of the said spring maintaining the parts in snug contact meanwhile. I would further state that the steam-port $d^3$ is thus kept closed during not only the completion of the forward stroke, but also during the return stroke or movement, the steam chest and valve meanwhile traveling in unison, as just stated. At the end of the return stroke the valve-arm $m$ automatically hooks onto or engages the latch-lever $k$, the action of the revolving cam D again swinging the steam-chest ahead from the now stationary valve $v$, thereby uncovering the steam-port into the cylinder, the port remaining open until again closed by the action of the valve-gear, as before described.

While the foregoing description of my improved rotary-piston engine relates more particularly to one in which a single steam-cylinder and piston combined with two oppositely-arranged valve-carrying steam-chests or abutments $d$ are employed, my invention is equally applicable and practicable in cases where two cylinders and a single steam-chest are used, the latter having two oppositely-arranged steam ports and valves adapted to communicate with both cylinders simultaneously. In the former construction, employing a single piston, steam is admitted into the cylinder four times during each revolution of the piston, while in the other or latter case, having two cylinders and a single steam-chest provided with two valves, the steam is admitted into each cylinder twice per revolution. Now by assuming that the cylinders, speed, and steam-pressure are the same in both cases it will be evident that the volume of steam used and the power thus developed by the engines are substantially the same. In some respects, however, the duplex-cylinder engine having a single steam-chest or abutment possesses advantages over the first-named construction.

In Figs. 8 to 12, inclusive, I have represented such a modification of my improved rotary engine. In this case the engine is provided with two transversely-separated cylinders $c$ and an interposed oscillatory double-ported steam-chest $d$, the functions of the latter being substantially the same as in the single-cylinder engine provided with a pair of single-ported steam-chests.

The engine shown in Figs. 8, &c., has a single steam-chest $d$, as just stated. It, however, is provided with top and bottom steam-ports $d^3$ and two cut-off valves $v$, secured to and controlled by the axial movements of the central tubular valve stem or shaft $e$. The mechanism for oscillating the combined steam-chest and abutment $d$ is such that the latter admits steam twice into each cylinder per revolution of the pistons $p$, thereby permitting the steam to be expanded to a greater degree. To the back end of each of the piston rods or shafts $r$ is secured a spur-gear $n$, these two intergearing with the intermediate idler-gear $n'$, thus insuring simultaneous rotary action of the pistons. Below and parallel with the axis of the steam-chest $d$ is mounted a revolving shaft $r'$, extending through the frame $a$. On the back end of this shaft is fixed a small gear $n^2$, meshing into gear $n'$, its diameter, as drawn, being just one-half that of the said driving-gears $n$. By means of this construction and arrangement the shaft $r'$ will revolve in the same direction as the shafts $r$ and at twice the speed. If desired, driving-pulleys may be secured to any or all of the shafts.

As drawn, (see Fig. 8,) the engine is provided with mechanism for oscillating the steam-chest $d$ on its axis, whereby steam may be admitted to the cylinders during nearly one-half of the piston's stroke or movement. It is also provided with mechanism adapted to be adjusted or set so as to cut off the steam, through the medium of the valves $v$, at different points, the movements of said mechanism being actuated by the lower or quick-running shaft $r'$.

The following is a description of the mechanism referred to: To the shaft $r'$ is secured a suitably-shaped track-cam F, which actuates the two-arm lever E', the vertical arm of the lever being jointed to a connection $h'$, in turn jointed to the end of the short lever $h$, the latter being secured to the outer end of the hub of the inner front head $g$ of the chest. (See also Fig. 11.) Thus it is clear that the chest $d$ will vibrate a fixed or invariable angular distance by and in unison with the revolving cam F.

The cut-off valve mechanism is driven by an eccentric $n^3$, secured to shaft $r'$, the work of the eccentric being transmitted to a swinging quadrant-shaped slotted link $o$, sliding block $o'$, mounted in the link, block-supporting lever $o^5$, connection $o^6$, jointed to the lever $o^5$ and to a short arm $h^2$, secured to the tubular stem or trunnion $e$, passing centrally through the said front head $g$ of the chest, a stuffing-box and gland $m'$ rendering the parts steam-tight. (See Figs. 8 and 11.) The stem $e$ extends into the steam-chest and is provided with oppositely-arranged extensions $e^3$ and steam-openings $e'$. (See also Fig. 10.) The upper and lower sides of the chest $d$ form ported seats for the valves $v$, substantially as hereinbefore described. The valves are attached to the said members $e^3$, springs $v'$ maintaining them in yielding contact with the seats. The link $o$ is suspended from the short connection $o^2$, jointed to the short end of the pivoted operating or hand lever $o^3$, the outer portion of the latter being adapted to engage the notched bar $o^4$ in a well-known manner. Obviously the valves $v$ may within fixed limits be set or adjusted to cut off the steam at various points corresponding with the positions of the lever $o^3$. The opposite or rear head $g'$ of the steam-chest $d$ has the corresponding end of the valve-stem $e$ seated therein. (See Fig. 11.) The hub or trunnion portion $e^2$ of said head extends through and turns in the central hub of the outer head or cover $a'$ of the engine-frame, the last-named hub forming an axle for the gear $n$ to revolve on. The outer ends of the members $e\ e^2$ extend into the stuffing-boxes C for the purpose of receiving live steam from the corresponding pipes $s'$, communicating therewith, substantially as before described, thus balancing the internal pressure on the chest and valves.

In order to maintain practically steam-tight joints at the two ends of the pistons $p$, I have provided them with circular flanges $p^3$, fitting the bore of the cylinders $c$. (See Fig. 12.) The peripheries of said flanges are in frictional engagement with freely-turning inclosed collars $a^5$, mounted on the hubs of the two heads $g\ g'$ of the steam-chest $d$. (See also Fig. 11.) It will be seen that the inner faces of the front and back heads or covers $a^2\ a'$ have integrally-formed extensions $a^4$. These latter are turned to fit the bore of the steam-chest chamber $b$ and are counterbored to freely receive the said collars $a^5$, the opposite sides of the head portions $a^4$ being cut away to receive the said revolving flanges $p^3$. (See Fig. 12.)

In my improved rotary engine it will be seen that the relative movements of the oscillating steam-chests to the continuously-revolving piston are such that the force of the steam acting upon the piston is resisted both by the walls of the cylinder and that portion of the ported side or periphery of the steam-chest contiguous to the piston, the said peripheral surface thus forming an abutment and presenting a varying area to the steam, the steam-space or expansion-chamber of the steam-cylinder at the same time increasing in area until the steam-chest completes its forward movement, the piston meanwhile being forced ahead by the steam. While this is taking place the steam-chest is in engagement with the piston's surface by means of a suitable steam-packing device, as $p^2$, thereby preventing steam from flowing through into the exhaust-passage. In fact, the arrangement is such that the packing is in constant contact with the piston. This applies equally as well to the single-piston duplex steam-chest arrangement as to the engine having two pistons and a single steam-chest.

In case the engine is provided with a governor-controlled detachable valve-gear, say of the Corliss type, substantially as represented in Fig. 1, any material variations in the speed or load will be automatically corrected by the action of the mechanism combined with the valve $v$, mounted within the steam-chest, the result being to release or trip the valve at a corresponding point in the steam-chest's movement, at which instant of release the force of the spring $k^3$ rotates the valve ahead and across the steam-port $d^3$ of the chest, thus cutting off the flow of steam into the cylinder. Obviously the steam then confined in the cylinder expands until the piston travels past the point of release or exhaust-opening $t'$.

I claim as my invention—

1. In a rotary engine of the class described, the combination with a rotating piston and its adjunctive devices, of a movable hollow abutment forming the live-steam chest and having a port therethrough arranged to open into the steam-cylinder, and a mechanically-actuated valve mounted in said steam-chest and in direct engagement with its port, substantially as described.

2. In a rotary engine, the combination with a rotating piston and the steam-cylinder therefor, of a cylindrical chamber, as $b$, arranged parallel with and intersecting said steam-cylinder, an oscillatory ported steam-chest or hollow abutment $d$ mounted in said chamber having a concave side coextensive with the bore of the steam-cylinder, and a mechanically-actuated steam-valve mounted in the steam-chest and controlling the port-opening, substantially as described.

3. In a rotary engine, a mechanically-actuated ported hollow abutment or steam-chest having a hollow stem or trunnion in continuous communication interiorly with the steam-supply, and an independently-movable cut-off valve mounted within the abutment having a hollow stem in continuous communication with the steam-supply, said valve-stem being provided with an opening through which the steam passes into the abutment-chamber $d'$, substantially as described.

4. The combination, with the steam-cylinder and a revoluble piston mounted therein, of a ported oscillatory steam-chest or abutment having a concave side forming the complement of the bore of said cylinder and arranged in the path of the piston, and further provided with means for maintaining steam-tight the surfaces of the piston and steam-chest when in engagement with each other, and a mechanically-actuated cut-off or steam valve mounted in the said steam-chest for closing the port thereof, substantially as described.

5. In a rotary engine, the combination with a suitably-mounted elliptical-shaped driving-piston, as $p$, adapted to rotate continuously in one direction, of an oscillating steam-chest, as $d$, having a port through its wall for admitting steam from the chest directly into the steam-cylinder to actuate the piston, arranged whereby the movement of the chest uncovers the said port into the cylinder after the piston has traveled past the steam-chest, and a mechanically-actuated cut-off valve mounted in the steam-chest adapted to close the port thereof, substantially as described.

6. In a rotary-piston engine, the combination of an oscillatory steam-chest provided with a port through which live steam flows into the cylinder to actuate the piston, a hollow stem $e^2$ rigidly secured to one end of said steam-chest for conducting steam into it, a valve mounted in the steam-chest and adapted to close the port of the latter, a hollow stem $e$ extending through the opposite end of the steam-chest also adapted to conduct live steam thereto and having said valve secured thereon, and independent mechanisms connected with the said two hollow stems for actuating the steam-chest and valve, substantially as described.

7. In a rotary engine, a suitably-mounted oscillatory combined steam-chest and abutment adapted to receive live steam through both ends thereof, thus equalizing the pressure within it, a port extending through the steam-chest wall through which steam flows into the steam-cylinder, and a governor-controlled valve mounted in the steam-chest adapted to close said port automatically, substantially as set forth.

8. In a rotary engine, the combination with a ported steam-chest in continuous communication with the steam-supply, and mechanism for intermittingly oscillating the steam-chest an invariable angular distance, of a valve mounted in said steam-chest, and mechanically-actuated liberating valve-gear adapted to close said port through the medium of said valve at various points within its range of action.

9. In a rotary-piston engine, the combination with an oscillating steam-chest provided with an outlet-port, and a central hollow stem or trunnion, as $e^2$, secured to the chest and in direct communication both with the steam-supply and the interior of the chest, of a valve $v$ mounted within the said steam-chest and arranged to overlap the port thereof, and a central hollow stem or trunnion, as $e$, secured to the valve and in direct communication both with the steam-supply and the interior of the chest, the said valve-stem extending through an end of and capable of being actuated independently of the steam-chest.

10. In a rotary-piston engine, the combination with a pair of suitably-mounted transversely-separated pistons geared together and revolving in unison in one direction, of an oscillatory combined steam-chest and abutment $d$ in continuous communication with the steam-supply interposed between and communicating with both the said pistons, oppositely-located steam-ports formed in the chest-walls through which steam enters the steam-cylinders simultaneously, a pair of oppositely-arranged valves $v$ mounted within the steam-chest adapted to close said steam-ports, and independent mechanisms for actuating said steam-chest and its valves, substantially as described.

11. In a steam-engine, the combination with the cylinder thereof and an oscillatory steam-chest communicating therewith, of a revoluble non-cylindrical piston mounted in said cylinder, the piston having fixed at each end thereof a circular flange, as $p^3$, fitting the bore of the cylinder, and an inclosed annular collar, as $a^5$, mounted exteriorly to the end of the steam-chest and adapted to turn freely on the latter's journal or hub, the edges or peripheries of the said flange and collar being in frictional engagement, thus forming steam-tight joints at the ends of the piston, substantially as described.

12. In a steam-engine, the combination with a pair of laterally-separated rotary elliptical pistons $p$ having circular flanges, as $p^3$, at the opposite ends thereof whose diameters are substantially the same as the length of the major axes of the pistons, of an oscillating steam-chest or abutment $d$ located centrally between and parallel with said pistons, and having the two end portions of said abutment provided with circular flanges counterbored into the corresponding heads or covers and in engagement with the periphery of said piston-flanges, substantially as hereinbefore described and for the purpose specified.

In testimony whereof I have affixed my signature in presence of two witnesses.

LUTHER H. WATTLES.

Witnesses:
GEO. H. REMINGTON,
REMINGTON SHERMAN.